(12) United States Patent
Matsui (10) Patent No.: US 7,184,240 B2
(45) Date of Patent: Feb. 27, 2007

(54) HARD DISK DEVICE

(75) Inventor: Tsutomu Matsui, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/176,680

(22) Filed: Jul. 8, 2005

(65) Prior Publication Data

US 2006/0023330 A1 Feb. 2, 2006

(30) Foreign Application Priority Data

Jul. 9, 2004 (JP) .............................. 2004-203144

(51) Int. Cl.
*G11B 5/02* (2006.01)
*G11B 21/02* (2006.01)

(52) U.S. Cl. ...................................... 360/75

(58) Field of Classification Search .............. 360/234.4
See application file for complete search history.

(56) References Cited

U.S. PATENT DOCUMENTS

| 4,965,691 | A | * | 10/1990 | Iftikar et al. | ................ | 360/133 |
| 5,235,481 | A | * | 8/1993 | Kamo et al. | ............. | 360/97.01 |
| 6,404,575 | B1 | * | 6/2002 | Yen | ............................ | 360/46 |
| 6,633,445 | B1 | * | 10/2003 | Wilke | .......................... | 360/55 |
| 6,748,865 | B2 | * | 6/2004 | Sakurai et al. | .............. | 101/483 |
| 6,798,609 | B1 | * | 9/2004 | Bonin et al. | ............. | 360/78.05 |
| 6,967,798 | B2 | * | 11/2005 | Homola et al. | ............... | 360/48 |

| 2004/0107355 | A1 | * | 6/2004 | Sakurai et al. | .............. | 713/193 |

FOREIGN PATENT DOCUMENTS

| JP | 6-267239 | | 9/1994 |
| JP | 06-309707 | A | 11/1994 |
| JP | 7-098892 | A | 4/1995 |
| JP | 8-249735 | A | 9/1996 |
| JP | 8-306178 | | 11/1996 |
| JP | 11-176033 | A | 7/1999 |
| JP | 2001-202144 | | 7/2001 |
| JP | 2003-178572 | | 6/2003 |
| JP | 2003-196964 | | 7/2003 |
| JP | 2003-272367 | | 9/2003 |
| JP | 2003-157520 | | 5/2005 |

* cited by examiner

*Primary Examiner*—K. Wong
(74) *Attorney, Agent, or Firm*—Global IP Counselors, LLP (57) ABSTRACT

A hard disk device is to be mounted onto a playing apparatus to play data in the hard disk device, and includes a casing, a spindle, a power supply circuit and a VCM coil accommodated within the casing, a recording medium disk rotatably supported on the spindle, an arm mechanism pivotably supported within the casing, and a head slider that is attached to a distal end of an arm of the arm mechanism and configured to detect the data in the recording medium disk. The spindle is configured to be driven by a spindle motor of the playing apparatus without being contacted by the spindle motor. The VCM coil is to be positioned between VCM magnets of the playing apparatus and is configured to drive the pivoting of the arm mechanism based on a drive current supplied from the power supply circuit.

16 Claims, 7 Drawing Sheets

HARD DISK DEVICE

BACKGROUND OF THE INVENTION

1. Field of the Invention

The present invention relates to a hard disk device. More particularly, the present invention relates to a transportable or portable hard disk device.

2. Background Information

Portable hard disk devices allow the user to carry around relatively a large amount of data on a DVD (Digital Versatile Disk), Blu-ray disk, or other such optical disk, and also allow the data to be read out at high speed. With a hard disk device, however, a disk, a head slider, and an arm mechanism that moves the slider all need to be in a sealed construction in order to prevent dust from getting inside. Furthermore, since a large number of parts are required, the manufacturing cost is high.

In particular, the head slider reads recorded data by moving closely, at a distance of just a few dozen nanometers, over the disk surface. Thus, the head slider needs to be micro-machined with high precision, and is therefore expensive. Furthermore, circuits for detecting the recorded data that are read need to be mounted separately on the arm mechanism. This also makes it difficult to lower the costs of the head slider and detection circuits.

Furthermore, such portable hard disks all involve a large number of parts. Generally, when the number of parts in a given structure is great, the possibility of malfunctioning occurring in any of the parts also becomes great. Therefore, a structure which requires a large number of parts tends not to last for a long period of time. Furthermore, the manufacturing costs tend to be high when a large number of parts are required.

In view of the above, it will be apparent to those skilled in the art from this disclosure that there exists a need for an improved hard disk device that overcomes the problems of the conventional art. This invention addresses this need in the art as well as other needs, which will become apparent to those skilled in the art from this disclosure.

SUMMARY OF THE INVENTION

It is an object of the present invention to provide an inexpensive hard disk device that has improved portability and is suited to the long-term storage of recorded data.

The hard disk device according to the first aspect of the present invention is adapted to be mounted onto a playing apparatus to play data in the hard disk device. The playing apparatus has a pair of VCM magnets and a spindle motor. The hard disk device includes a casing, a spindle accommodated within the casing and configured to be driven by the spindle motor without being contacted by the spindle motor, a recording medium disk rotatably supported on the spindle, an arm mechanism pivotably supported within the casing, a power supply circuit accommodated within the casing, a VCM coil accommodated within the casing, adapted to be positioned between the VCM magnets, and configured to drive the pivoting of the arm mechanism based on a drive current supplied from the power supply circuit, and a head slider that is attached to a distal end of an arm of the arm mechanism and configured to detect the data in the recording medium disk.

With this hard disk device, the head slider can be simply assembled merely by attaching it to the arm mechanism. Plus, since there is no contact with an electrode, or vibration of an electrode for detecting electrostatic capacitance, the hard disk device can withstand extended use and is suited to the long-term storage of recorded information. Therefore, a hard disk device that is suited to the long-term storage of recorded information can be provided inexpensively.

With this hard disk device, the spindle motor and magnet that drive the VCM coil are disposed in an external device, which reduces the number of required parts and greatly lowers the probability of malfunction or the need for replacement. Also, since the VCM coil is driven without coming into contact with external components, and the spindle is rotated in a non-contact fashion by an external spindle motor, the deterioration of parts due to frictional wear can be prevented. By reducing the number of parts and preventing the wear of components, the hard disk device can be rendered better suited to the long-term storage of recorded information.

Also, since no heavy magnet or spindle motor is included in the hard disk device, the hard disk device can be more compact and lightweight, which makes it more portable. The reduction in the number of parts also helps to lower the manufacturing cost.

In the hard disk device according to the second aspect of the present invention, the head slider has strip line circuits that include an oscillator configured to output a carrier wave, a resonator circuit into which the carrier wave is configured to be inputted, the resonator circuit including an electrode that is configured to detect an electrostatic capacitance between itself and the recording medium disk, the resonator circuit being further configured to output an AM modulated wave by AM modulation of the carrier wave based on the detected electrostatic capacitance, and a detector circuit that is configured to output the electrostatic capacitance by detecting the AM modulated wave.

With this hard disk device, since circuits for detecting electrostatic capacitance, namely, an oscillator circuit, a resonator circuit, and a detector circuit, are formed on the surface of the head slider as strip line circuits, head sliders can be manufactured inexpensively and in large volume along with detector circuits by a semiconductor microworking process.

In the hard disk device according to the third aspect of the present invention, data are recorded in the recording medium disk as pits formed thereon by nano-imprinting.

In the hard disk device according to the fourth aspect of the present invention, the recording medium disk is a ROM disk.

In the hard disk device according to the fifth aspect of the present invention, the playing apparatus has an apparatus-side communicator, and a communicator configured to receive signals indicating the electronic capacitance detected by the head slider and send the signals to the apparatus-side communicator of the playing apparatus, and receive drive signals from the apparatus-side communicator and send the drive signals to the VCM coil.

In the hard disk device according to the sixth aspect of the present invention, the spindle is configured to be driven by the spindle motor without being contacted by the spindle motor.

Here, since the spindle motor is provided to the external playing apparatus, there is a further reduction in the number of parts. And the rotation of the external spindle motor is transmitted in non-contact fashion to the spindle, which prevents deterioration due to wear that occurs during the transmission of the rotation of the spindle motor to the spindle.

In the hard disk device according to the seventh aspect of the present invention, the playing apparatus has an apparatus-side power source circuit, and the power supply circuit is configured to receive supply of power from the apparatus-side power source circuit of the playing apparatus without contacting the apparatus-side power source circuit.

Since the power supply is received in non-contact fashion and signal transmission is performed by optical communication or wireless high-frequency transmission, there is no need for connectors for power supply or signal transmission, which further reduces the number of parts needed. By eliminating the connectors, deterioration of the connectors caused by wear can also be prevented.

In the hard disk device according to the eighth aspect of the present invention, the recording medium disk has a ROM and a RAM, and the communicator is configured to receive data to be recorded in the recording medium disk from the apparatus-side communicator.

A playing apparatus according to the present invention is for playing data in a separate hard disk device, and includes a pair of VCM magnets between which a VCM coil of the hard disk device is adapted to be positioned, an apparatus-side communicator configured to communicate with a device-side communicator of the hard disk device to receive signals therefrom, a spindle motor adapted to drive a spindle of the hard disk device without contacting the spindle, and a signal processor operatively coupled to the apparatus-side communicator and configured to process signals received from the device-side communicator.

A hard disk system according the present invention includes a playing apparatus and a hard disk device to be mounted onto the playing apparatus to play data in the hard disk device. The playing apparatus includes a pair of VCM magnets, an apparatus-side communicator, a spindle motor, a signal processor operatively coupled to the apparatus-side communicator to process signals received by the apparatus-side communicator, and an apparatus-side power supply circuit. The hard disk device includes a casing, a spindle accommodated within the casing and configured to be driven by the spindle motor without being contacted by the spindle motor, a recording medium disk rotatably supported on the spindle and having data recorded therein as pits formed thereon by nano-imprinting, an arm mechanism pivotably supported within the casing, a device-side power supply circuit accommodated within the casing and configured to receive supply of power from the apparatus-side power source circuit without contacting the apparatus-side power source circuit, a VCM coil accommodated within the casing, adapted to be positioned between the VCM magnets, and configured to drive the pivoting of the arm mechanism based on a drive current supplied from the device-side power supply circuit, a head slider that is attached to a distal end of an arm of the arm mechanism and configured to detect the data in the recording medium disk, and a device-side communicator configured to receive signals indicating the electronic capacitance detected by the head slider and send the signals to the apparatus-side communicator, and receive drive signals from the apparatus-side communicator and send the drive signals to the VCM coil.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4(*a*) is a schematic side view of the layout of the spindle and the spindle motor of the hard disk device in accordance with an embodiment of the present invention;

FIG. 4(*b*) is a schematic detailed view of the layout of the spindle and the spindle motor of the hard disk device in accordance with an embodiment of the present invention;

FIG. 4(*c*) is a schematic perspective view of the layout of the spindle and the spindle motor of the hard disk device in accordance with an embodiment of the present invention;

FIG. 5(*a*) is a perspective view of the head slider in accordance with an embodiment of the present invention;

FIG. 5(*b*) is an equivalent circuit diagram of the head slider in accordance with an embodiment of the present invention;

FIGS. 7(*a*) and 7(*b*) are schematic views of two examples of the layout of the RAM and ROM regions on a disk.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
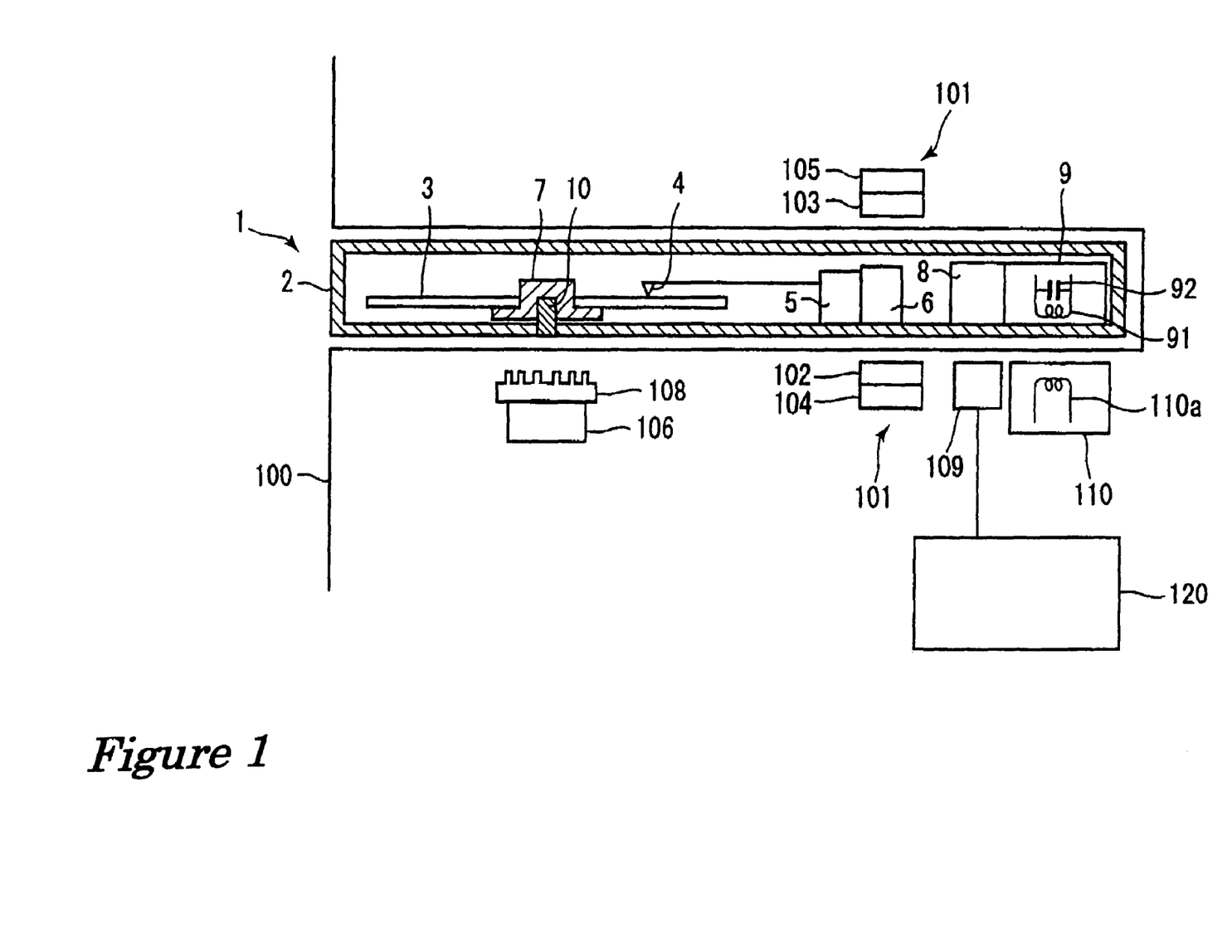
FIG. 1 is a simplified cross section of the constitution of a hard disk device in accordance with an embodiment of the present invention.

FIG. 1 is a simplified cross sectional view of the overall structure of a portable hard disk device 1 in accordance with an embodiment of the present invention. The hard disk device 1 has a casing 2 that is substantially cuboid in shape and accommodates therein a disk 3, a spindle 7, and other parts.

This hard disk device 1 of the present embodiment is a read-only hard disk device, and the recorded data are read out when this hard disk device 1 is mounted in a recording and/or playing device 100 (hereinafter referred to as recording/playing device 100).

The hard disk device 1 includes the casing 2, a disk 3, a head slider 4 that reads data from the disk 3, an arm mechanism 5 that moves the head slider 4 to a specific position, a VCM (Voice Coil Motor) coil 6 (hereinafter referred to as VCM coil 6) that drives the arm mechanism 5, a spindle 7 that supports the disk 3, a communicator 8 that sends and receives signals to and from the recording/playing device 100 by optical communication or wireless high-frequency transmission, and a power supply circuit 9 that supplies power to the various components.

The recording/playing device 100 includes VCM magnets 101 that generate an external magnetic field that penetrates through the VCM coil 6, a spindle motor 106 that rotates the spindle 7 without contacting the spindle 7, a communicator 109 that sends and receives data to and from the communicator 8 by optical communication or wireless high-frequency transmission, a signal processing circuit 120 that is operatively connected to the communicator 109 and processes servo signals and playing signals sent to and received from the communicator 109, and a power supply circuit 110 that supplies power to the power supply circuit 9 without contacting the power supply circuit 9.

Although not shown in the figures, the recording/playing device 100 also includes a controller that is operatively coupled to the VCM magnets 101, the spindle motor 106, the communicator 109, the power supply circuit 110, and the signal processor 120. The controller includes other conventional components such as an input interface circuit, an output interface circuit, and storage devices such as a ROM (Read Only Memory) device and a RAM (Random Access Memory) device. The controller also has programs to selectively control the circuits connected thereto.

The disk 3 is a recording medium to which data are transferred at a high speed by forming pits by nano-imprinting. The disk 3 is used as a read-only memory (ROM) in this embodiment. The disk 3 has a diameter that is suitable for portable hard disks, such as 3.5, 2.5, 1.8, 1.0, or 0.8 inches, for example. Where data are transferred by high-speed nano-imprinting, video and other such large-volume graphic data can be recorded to the disk 3 inexpensively and quickly. The highest surface recording density that can be achieved with optical recording/playing technology is 18 Gb psi, but a surface recording density of 100 to 500 Gb psi can be attained with hard disk-related technology. The storage capacity of the disk 3 is therefore larger than that of optical disks such as DVD (Digital Versatile Disk), Blu-ray disks. Therefore, more data can be recorded in the disk 3 than in an optical disk.

Figure 5:
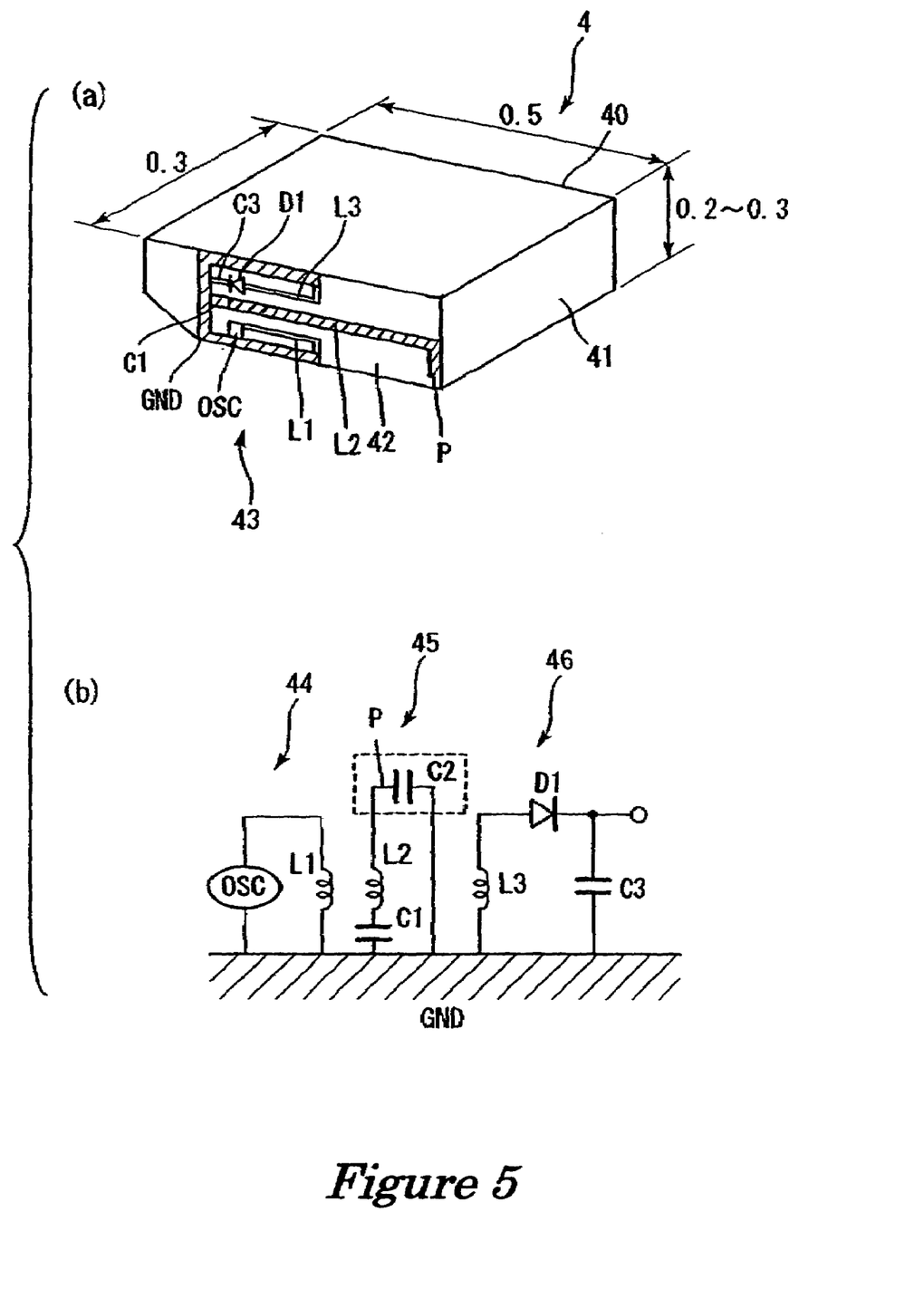

FIG. 5 are diagrams showing the structure of the head slider 4, with FIG. 5a being a perspective view of the head slider 4, and FIG. 5b an equivalent circuit diagram of a micro-strip line circuit 43 formed on a slider main body 4a.

Figure 2:
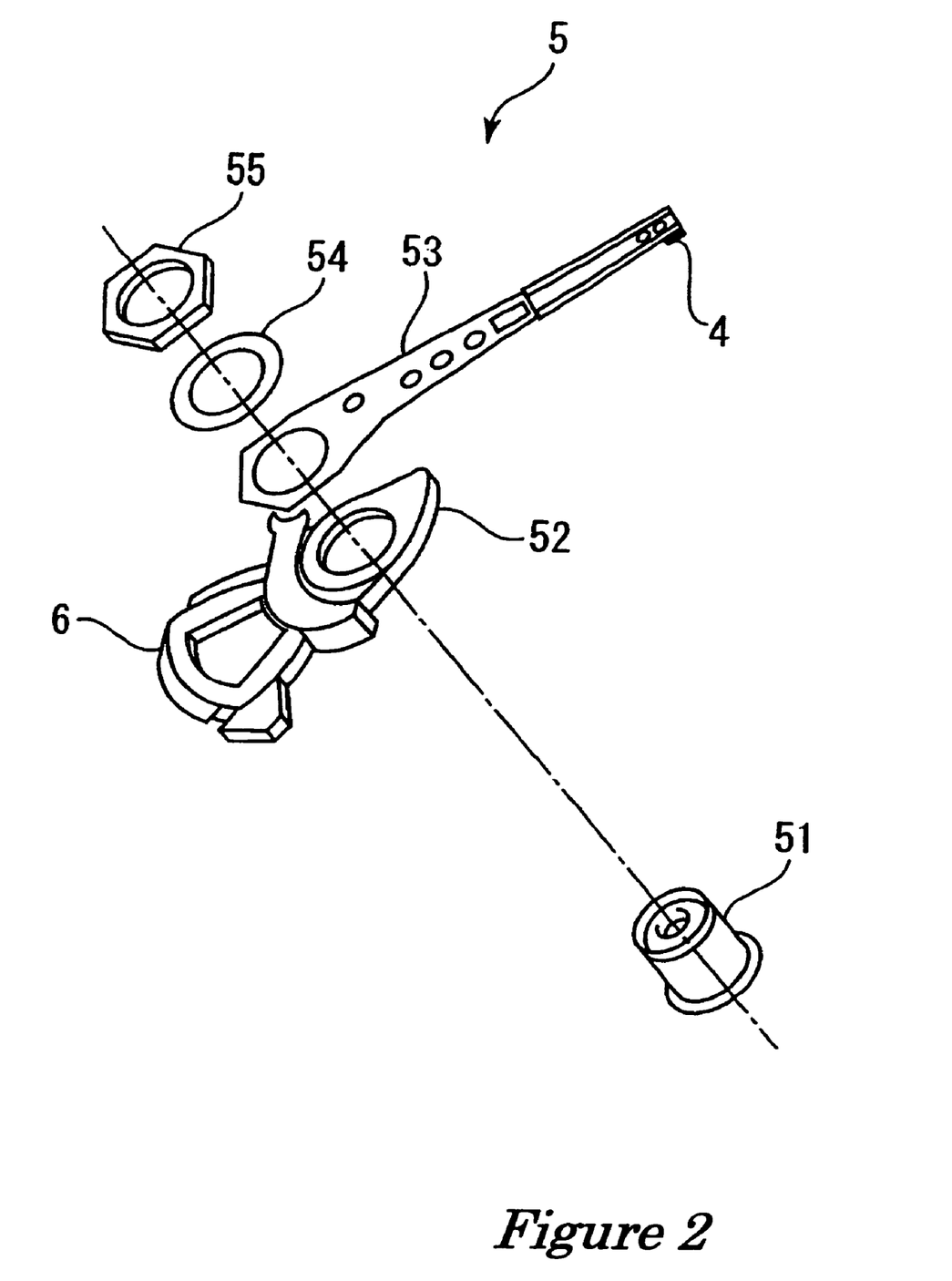
FIG. 2 is an exploded perspective view of the arm mechanism of the hard disk device in accordance with an embodiment of the present invention.

The head slider 4 is attached to a distal end of an arm 53 of the arm mechanism 5, as shown in FIG. 2. As shown in FIG. 5a, the head slider 4 includes a slider main body 40 and the micro-strip line circuit (detector circuit) 43 formed on the slider main body 40. As shown in FIG. 5a, the slider main body 40 is substantially cuboid in shape, with the lower rear portion being partially cut off. As shown in FIG. 5a, the dimensions of the slider main body 40 are 0.3 mm long, 0.5 mm wide, and 0.2 to 0.3 mm tall.

The micro-strip line circuit 43 is formed on a side face 42 of the slider main body 40. The head slider 4 is formed by subjecting a silicon wafer to a semiconductor micro-working process. More specifically, the micro-strip line circuit 43 is formed by forming multiple layers of wiring or elements from hafnium or the like on the side face 42, which is exposed on the surface of the silicon wafer. Then, the silicon wafer is diced into individual pieces. A wiring that outputs the outputs from the micro-strip line circuit 43 (the output from a capacitor C3 discussed below) extends from inside the pattern on the side face 42 to the top surface of the slider main body 40 and then to the distal end of an arm 53 shown in FIG. 2 (the gimbal of the head suspension). The output transmitted to the distal end of the arm 53 is further transmitted to the communicator 8 via a preamplifier and a wiring provided to the arm 53.

As shown in FIGS. 5a and 5b, the micro-strip line circuit 43 includes an oscillator circuit 44 formed of an oscillator OSC and an inductor L1, a resonator circuit 45 formed of an inductor L2 and capacitors C1 and C2, and a detector circuit 46 formed of an inductor L3, a diode D1, and the capacitor C3. The capacitor C2 of the resonator circuit 45 here is the electrostatic capacitance between an electrode P and the disk 3, and varies depending on the pit pattern on the disk 3.

A ground pattern GND is formed in a substantially open-box-section shape on the side face 42, and the electrode P extends toward the bottom face near the front face 41 of the slider main body 40. Here, the electrode P is formed near the front face 41 so as to extend toward the bottom because the bottom face of the slider main body 40 on the front face 41 side comes closest to the surface of the disk 3 when data are read from the disk 3. The bottom edge of the front face 41 of the slider main body 40 approaches near the surface of the disk 3 at a gap of no more than a few dozen nano meters, for example, and the recorded data are read by detecting the electrostatic capacitance C2 without the electrode P contacting the disk 3.

At the oscillator circuit 44, the oscillator OSC outputs a carrier wave of 1 GHz, and this carrier wave is outputted through the inductor L1 to the inductor L2.

The resonator circuit 45 oscillates at a resonance frequency of about 1.1 GHz, and this resonance frequency fluctuates based on changes in the electrostatic capacitance C2 between the electrode P and the disk 3. The resonator circuit 45 subjects the carrier wave inputted to the inductor L2 to AM modulation based on the change in the electrostatic capacitance C2, and the AM modulated wave is outputted through the inductor L2 to the inductor L3.

At the detector circuit 46, the AM modulated wave inputted to the inductor L3 is detected by slope detection by the diode D1 and the capacitor C3, and the electrostatic capacitance of the capacitor C2 is detected. In other words, the micro-strip line circuit 43 subjects the carrier wave to the AM modulation according to the change in the electrostatic capacitance C2 between the electrode P and the disk 3, and the AM modulated wave is subjected to slope detection to detect the electrostatic capacitance C2, which indicates the recorded data.

Figure 6:
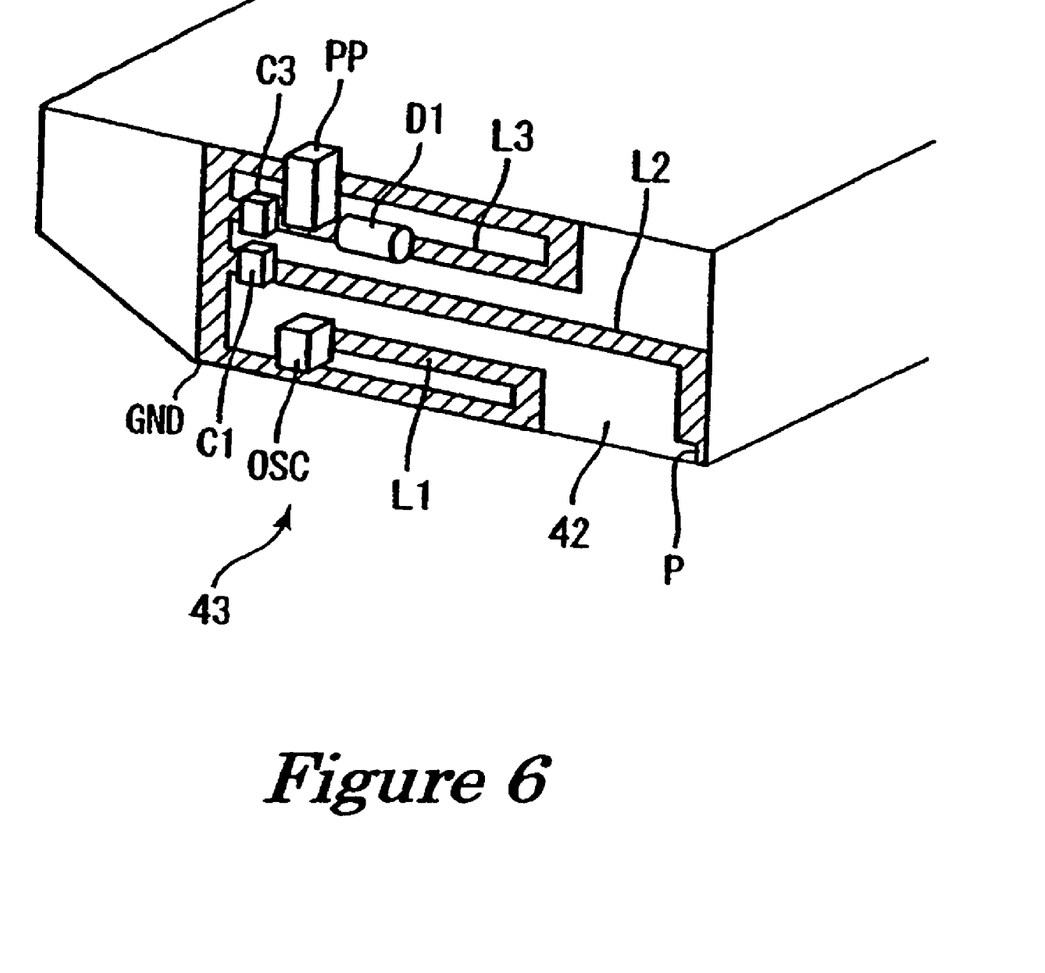
FIG. 6 is a partial perspective view of the head slider in accordance with an embodiment of the present invention.

As shown in FIG. 6, when microchip parts are used for the elements of the micro-strip line circuit 43 such as the capacitors C1, C3 and the diode D1, an insulated chip PP shown in FIG. 6 is used so that the output from the capacitor C3 can be extracted. The insulated chip PP is attached to the micro-strip line circuit 43 while being connected to the wiring between the capacitor C3 and the diode D1 but insulated from the GND line, and extracts the output from the capacitor C3 to the distal end of the arm 53 (the gimbal of the head suspension). The output transmitted to the distal end of the arm 53 is further transmitted to the communicator 8 via the preamplifier and the wiring provided to the arm 53.

With this micro-strip line circuit 43, the data recorded on the disk 3 can be read by detecting the electrostatic capacitance C2, which varies depending on the pit pattern on the disk 3.

As shown in FIG. 2, the arm mechanism 5 mainly includes a bearing unit 51 fixedly attached to the bottom of the casing 2, a rotor 52 mounted onto the bearing unit 51, and the arm 53 at the distal end of which the head slider 4 is mounted. These components are coupled to one another via a washer 54 and a nut 55. The rotor 52 is pivotably supported by the bearing unit 51. The VCM coil 6 is mounted on the outer side (the side opposite from the head slider 4) of the rotor 52. The arm mechanism 5 is also provided with a FPC (Flexible Printed Circuit; not shown in figures). The FPC connects the micro-strip line circuit 43 of the head slider 4 to the communicator 8 via the preamplifier. The FPC also supplies drive current to the VCM coil 6.

Figure 3:
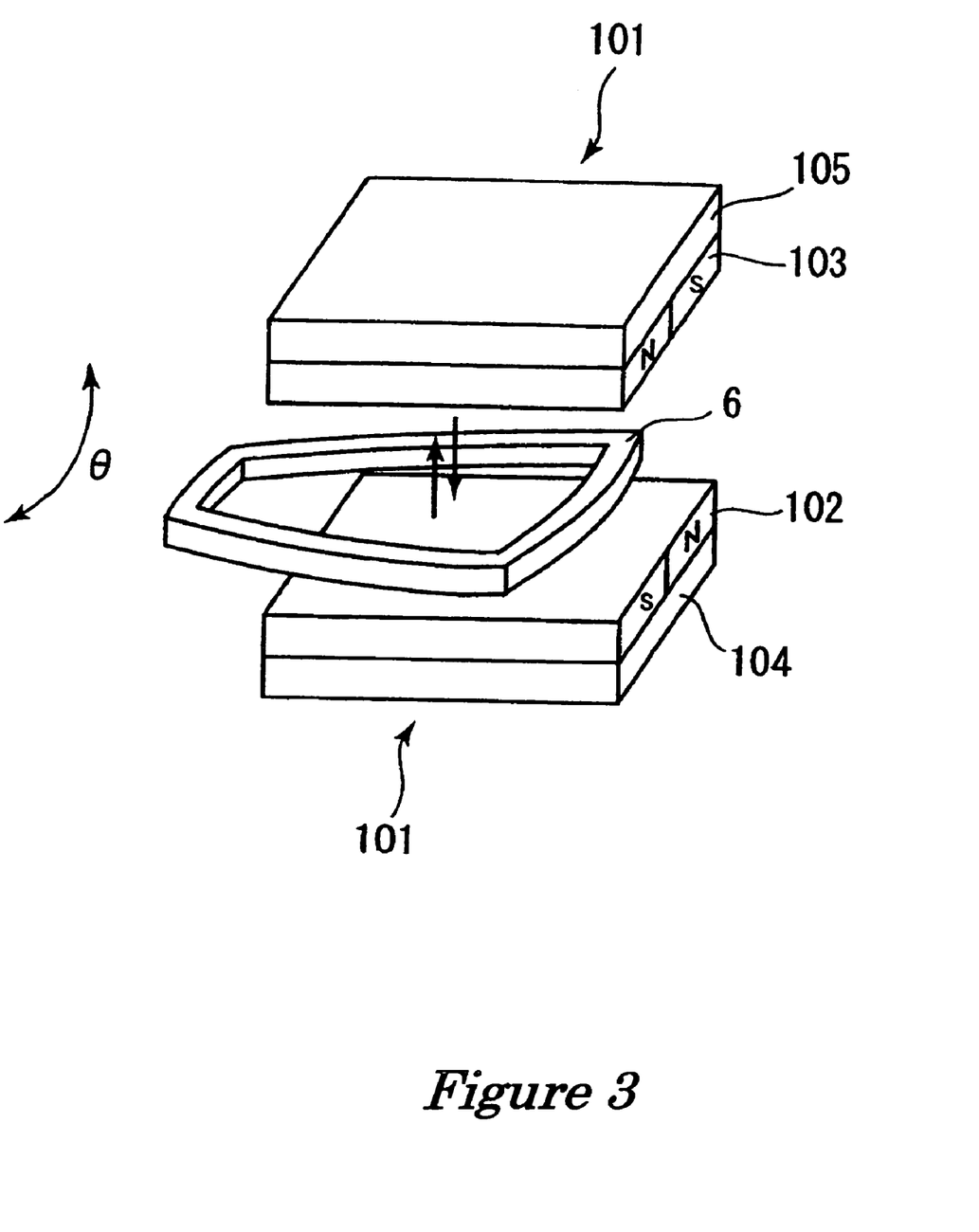
FIG. 3 is a partial perspective view of the layout of the VCM coil and VCM magnets of the hard disk device in accordance with an embodiment of the present invention.

As discussed above, the VCM coil 6 is attached to the outer side of the rotor 52 of the arm mechanism 5. The positions of the head slider 4 and the arm 53 of the arm mechanism 5 are controlled by the pivoting of the VCM coil 6. As shown in FIGS. 1 and 3, the VCM magnets 101 are disposed so as to flank the VCM coil 6 on either side when the hard disk device 1 is mounted in the recording/playing device 100. The casing 2 is not shown in FIG. 3, but as shown in FIG. 1, the VCM magnets 101 are provided outside of the casing 2, that is, to the recording/playing device 100. The VCM magnets 101 generate an external magnetic field that penetrates through the VCM coil 6 via the casing 2. Drive current is supplied from a VCM driver (not shown) to the VCM coil 6. The VCM driver receives its power supply from the power supply circuit 9, and outputs the drive current based on a drive signal received from the communicator 8.

When the drive current is supplied to the VCM coil 6 while the VCM coil 6 is in the external magnetic field generated by the VCM magnets 101, the drive current generates rotational propulsion that pivots the VCM coil 6 in the directions shown as the arrow θ in FIG. 3. The VCM magnets 101 include magnets 102 and 103 that are disposed so as to flank the VCM coil 6, and yokes 104 and 105 that regulate the magnetic flux of the magnets 102 and 103 such that the magnetic flux is concentrated in necessary areas.

Figure 4:
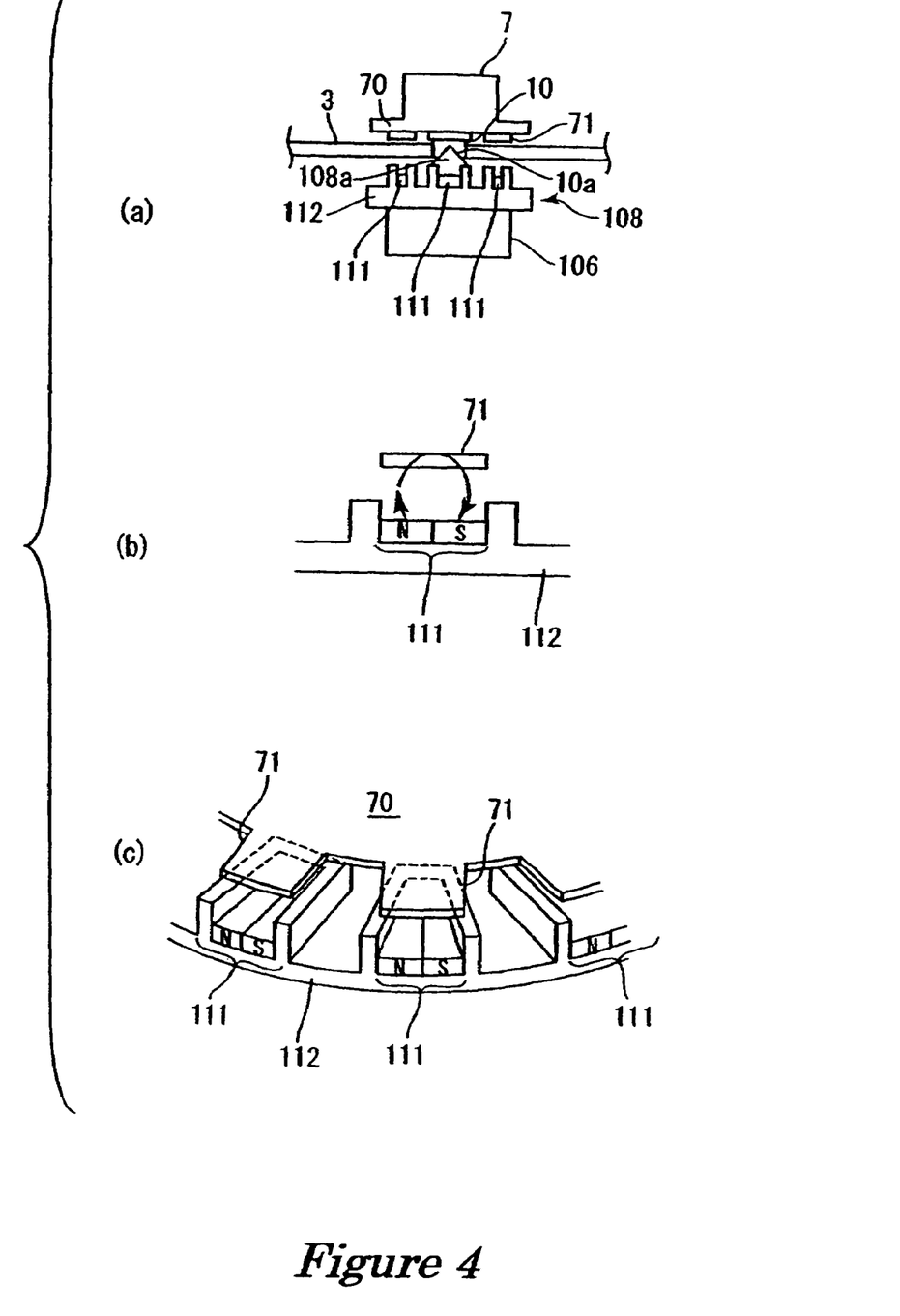

The spindle 7 is made of plastic or the like, and as shown in FIG. 4a, is rotatably supported on a bearing 10, which is provided to the bottom of the casing 2. A disk-shaped magnetic material 70 is provided to the lower surface of the spindle 7 as shown in FIG. 4c. A plurality of protrusions 71 is formed at an equidistant spacing around the outer periphery of the magnetic material 70. The disk 3 is inserted onto and non-rotatably and fixedly supported on the spindle 7.

When the hard disk device 1 is installed in the recording/playing device 100, a magnetic rotary plate 108 is disposed under the spindle 7 with the bottom of the casing 2 therebetween. A convex component 108a is provided in the middle of the upper surface of the magnetic rotary plate 108, and this convex component 108a rotatably fits into a concave component 10a of the bearing 10. In this manner, the centers the bearing 10 and the magnetic rotary plate 108 are aligned to one another.

The magnetic rotary plate 108 is fixedly coupled to the rotary shaft of the spindle motor 106, and is rotated by the spindle motor 106. The magnetic rotary plate 108 includes a disk-shaped yoke 112, and a plurality of magnets 111 that is disposed equidistantly and as substantially the same shape as the protrusions 71 of the spindle 7. Ribs for supporting the magnets 111 are formed on the yoke 112. The magnets 111 of the magnetic rotary plate 108 are magnetically bound to the protrusions 71 of the spindle 7 so that the rotation of the spindle motor 106 is transmitted to the spindle 7 through the protrusions 71. Specifically, the rotation of the spindle motor 106 is transmitted to the magnetic rotary plate 108, the rotation of the magnetic rotary plate 108 is transmitted to the spindle 7 via magnetic force without the spindle 7 contacting the magnetic rotary plate 108, and the rotation of the spindle 7 causes the disk 3 to rotate.

The power supply circuit 9, together with a primary coil 101a provided to the power supply circuit 110 of the recording/playing device 100, constitutes a transformer. The power supply circuit 9 includes a secondary coil 91 that receives a supply of power from the primary coil 101a, and a rechargeable battery 92 that stores power supplied by the secondary coil 91. The power supply circuit 9 also includes a diode or the like for rectifying the AC voltage generated at the secondary coil 91. The rechargeable battery 92 is preferably one that is compact and has high capacity, such as an electric double layer capacitor, an aluminum electrolytic capacitor, or a tantalum capacitor. Because the power supply circuit 9 receives a supply of power from outside the casing 2 in a non-contact manner, in other words without going through any connectors, cables, or the like, there is no need to provide connectors or cables to supply power to the hard disk device 1.

The communicator 8 sends and receives signals to and from the communicator 109 of the recording/playing device 100 by optical communication or wireless high-frequency transmission. The communicator 8 transmits to the communicator 109 the playing signal and the servo signal that have been outputted from the head slider 4 through the preamplifier. The communicator 8 also receives from the communicator 109 drive signals that are ultimately transmitted to the VCM coil 6.

With the hard disk device 1 in this embodiment, the spindle 7 is rotated via the magnetic rotary plate 108 without being contacted by the spindle motor 106, and the VCM coil 6 is driven without being contacted by the VCM magnets 101, which are disposed outside of the casing 2. Also, the recorded data (pits) on the disk 3 are detected as the electrostatic capacitance C2 (playing signal and servo signal) by the micro-strip line circuit 43 of the head slider 4. The playing signal and the servo signal are transmitted from the communicator 8 to the recording/playing device 100 by optical communication or wireless high-frequency transmission. In the recording/playing device 100 of the present embodiment, the playing signal and the servo signal are received by the communicator 109 and then processed by the signal processing circuit 120.

With the hard disk device 1 in this embodiment, a circuit for detecting the electrostatic capacitance C2 is formed on the surface of the head slider 4 as the strip line circuit 43, specifically, the oscillator circuit 44, the resonator circuit 45, and the detector circuit 46. Therefore, the head slider 4 together with the detector circuit 43 can be mass-manufactured inexpensively by a semiconductor micro-working process.

Also, the head slider 4 can be assembled easily by merely attaching the head slider 4 to the arm mechanism 5. Furthermore, the hard disk device 1 does not require vibration of the electrode P to detect the electrostatic capacitance C2. Therefore, the hard disk device 1 can withstand even longer use and is suited to the long-term storage of recorded data. Therefore, a hard disk device 1 that is suited to the long-term storage of recorded information can be provided inexpensively.

Also, with the hard disk device 1 of this embodiment, the VCM magnets 101 and the spindle motor 106 are disposed externally to the recording/playing device 100. Therefore, the number of required parts of the hard disk device 1 is reduced, and the probability of malfunction or the need for replacement can be lowered significantly.

Also, since the VCM coil 6 is driven without being contacted by the external recording/playing device 100, and the spindle 7 is rotated without being contacted by the external spindle motor 106. Therefore, deterioration of parts by frictional wear can be reduced. By reducing the number of parts and reducing the occurrences of the wear of components, the hard disk device is rendered better suited to the long-term storage of recorded information.

Also, since the heavy VCM magnets 101 and spindle motor 106 are formed as part of the recording/playing device 100, not as part of the hard disk device 1, the hard disk device 1 can be more compact and lightweight, which increases its portability. The reduction in the number of parts also helps lower the manufacturing cost.

Also, since the power supply circuit 9 receives power without being physically contacted by the power supply circuit 110, and the communicator 8 performs signal transmission by optical communication or wireless high-frequency transmission, there is no need for connectors for power supply or signal transmission. Accordingly, the number of parts needed in the hard disk device 1 can be reduced even further. By eliminating the connectors, deterioration caused by wear to the connectors can also be prevented.

In addition, the portable hard disk device 1 of this embodiment provides portability comparable to that of an optical disk, and allows more data to be recorded than in an optical disk. Thus, the hard disk device 1 is a recording medium suited to inexpensively recording large amounts of data. This hard disk device 1 is capable of recording more video software titles than existing recording media such as DVD software, and is therefore particularly suited to recording of video software. When read-only data are to be recorded in the hard disk device 1, as in the case of video software, the hard disk device can be structured for read-only purposes, so the head slider 4 can be equipped with just a read head, which affords an even simpler structure.

Other Embodiments

Figure 7:
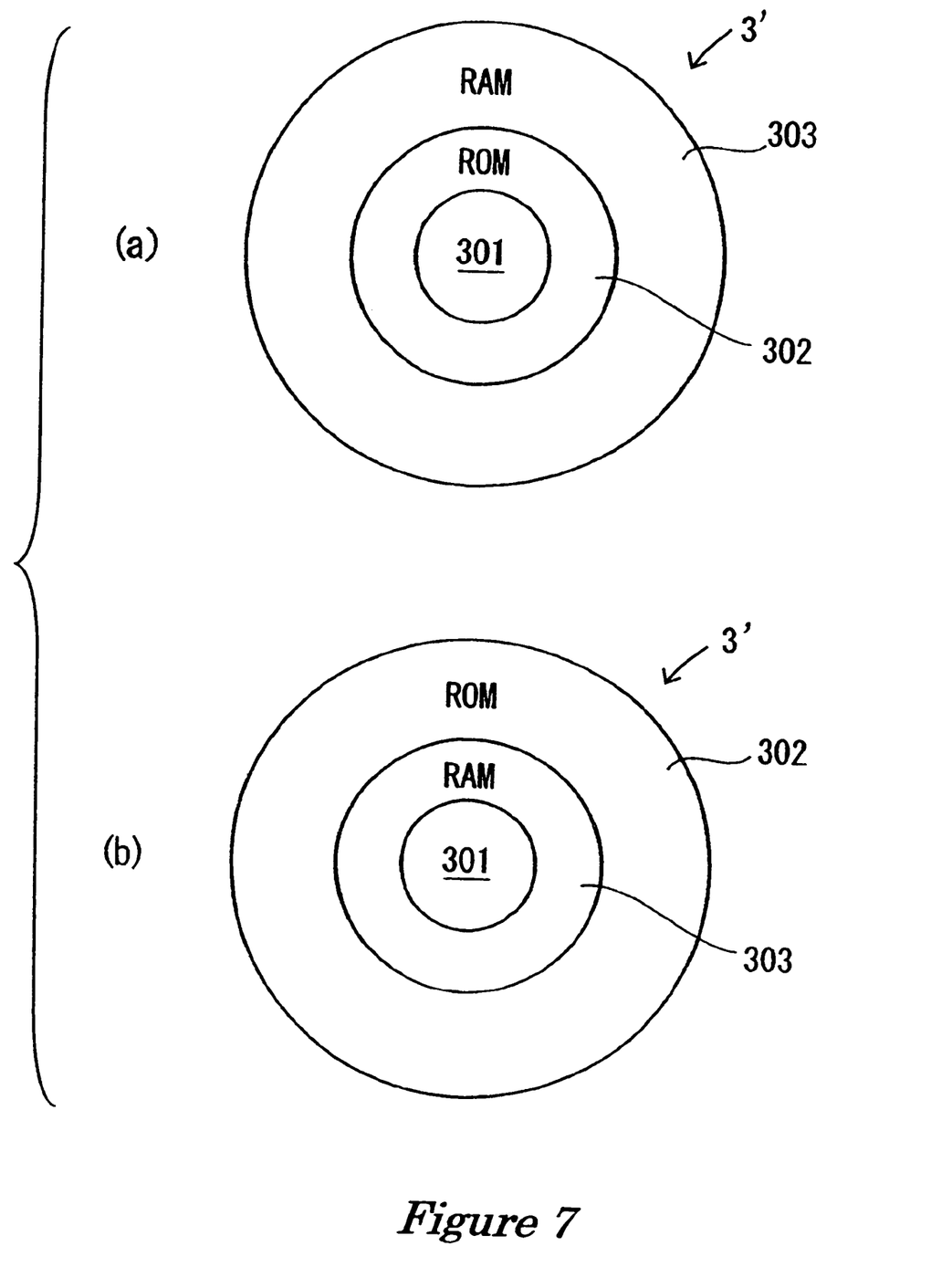

In the above embodiment, the hard disk device 1 is for read-only purposes, and the disk 3 is a read-only ROM disk. But as shown in FIG. 7, a ROM region 302 and RAM region 303 may be provided to the disk 3'. In the example shown in FIG. 7a, the ROM region 302 is provided on the inner peripheral side (the opening 301 side), and the RAM region 303 is provided on the outer peripheral side. In the example in FIG. 7b, the RAM region 303 is provided on the inner peripheral side, and the ROM region 302 is provided on the outer peripheral side.

When the hard disk device 1 is designed for both recording and playing purposes, the head slider 4 includes both a read head and a write head, and the communicator 8 will receive data to be written from the communicator 109 of the recording/playing device 100.

If the RAM region 303 is provided to the disk 3' as shown in FIG. 7, video softwares or the like can be recorded in the ROM region and provided to the user, while data for organizing the recorded of data, such as the titles of the video softwares, can be written by the user.

The present invention provides an inexpensive hard disk device that has improved portability and is suited to the long-term storage of recorded information.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-203144. The entire disclosure of Japanese Patent Application No. 2004-203144 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A hard disk device adapted to be mounted onto a playing apparatus to play data in the hard disk device, the playing apparatus having an apparatus-side power source circuit, an apparatus-side communicator, a pair of VCM magnets, and a spindle motor, the hard disk device comprising:

a casing;

a spindle accommodated within the casing and configured to be driven by the spindle motor without being contacted by the spindle motor;

a recording medium disk rotatably supported on the spindle and having data recorded therein as pits formed thereon by nano-imprinting;

an arm mechanism pivotably supported within the casing;

a power supply circuit accommodated within the casing and configured to receive supply of power from the apparatus-side power source circuit of the playing apparatus without contacting the apparatus-side power source circuit;

a VCM coil accommodated within the casing, adapted to be positioned between the VCM magnets, and configured to drive the pivoting of the arm mechanism based on a drive current supplied from the power supply circuit;

a head slider that is attached to a distal end of an arm of the arm mechanism and has strip line circuits, the strip line circuits including an oscillator configured to output a carrier wave, a resonator circuit into which the carrier wave is configured to be inputted, the resonator circuit including an electrode that is configured to detect an electrostatic capacitance between itself and the recording medium, the resonator circuit being further configured to output an AM modulated wave by the AM modulation of the carrier wave based on the detected electrostatic capacitance, and a detector circuit that is configured to output the electrostatic capacitance by detecting the AM modulated wave; and a communicator configured to receive signals indicating the electronic capacitance detected by the head slider and send the signals to the apparatus-side communicator, and receive drive signals from the apparatus-side communicator and send the drive signals to the VCM coil.

2. The hard disk device adapted according to claim 1, wherein the head slider is configured to detect the data in the recording medium disk.

3. The hard disk device according to claim 2, wherein data are recorded in the recording medium disk as pits formed thereon by nano-imprinting.

4. The hard disk device according to claim 2, wherein the recording medium disk is a ROM disk.

5. The hard disk device according to claim 2, further comprising
the playing apparatus has an apparatus-side communicator, and
a communicator configured to receive signals indicating the electronic capacitance detected by the head slider and send the signals to the apparatus-side communicator of the playing apparatus, and receive drive signals from the apparatus-side communicator and send the drive signals to the VCM coil.

6. The hard disk device according to claim 5, wherein the recording medium disk has a ROM and a RAM, and
the communicator is configured to receive data to be recorded in the recording medium disk from the apparatus-side communicator.

7. The hard disk device according to claim 2, further comprising
the spindle is configured to be driven by the spindle motor without being contacted by the spindle motor.

8. The hard disk device according to claim 2, wherein the playing apparatus has an apparatus-side power source circuit, and
the power supply circuit is configured to receive supply of power from the apparatus-side power source circuit of the playing apparatus without contacting the apparatus-side power source circuit.

9. The hard disk device according to claim 1, wherein the recording medium disk is a ROM disk.

10. The hard disk device according to claim 1, wherein the recording medium disk has a ROM and a RAM, and
the communicator is configured to receive data to be recorded in the recording medium disk from the apparatus-side communicator.

11. A hard disk device adapted to be mounted onto a playing apparatus to play data in the hard disk device, the playing apparatus having a pair of VCM magnets and a spindle motor, the hard disk device comprising:
a casing;
a spindle accommodated within the casing and configured to be driven by the spindle motor;
a recording medium disk rotatably supported on the spindle;
an arm mechanism pivotably supported within the casing;
a power supply circuit accommodated within the casing;
a VCM coil accommodated within the casing, adapted to be positioned between the VCM magnets, and configured to drive the pivoting of the arm mechanism based on a drive current supplied from the power supply circuit; and
a head slider that is attached to a distal end of an arm of the arm mechanism and configured to detect the data in the recording medium disk,
the head slider has having strip line circuits that include
an oscillator configured to output a carrier wave,
a resonator circuit into which the carrier wave is configured to be inputted, the resonator circuit including an electrode that is configured to detect an electrostatic capacitance between itself and the recording medium disk, the resonator circuit being further configured to output an AM modulated wave by AM modulation of the carrier wave based on the detected electrostatic capacitance, and
a detector circuit that is configured to output the electrostatic capacitance by detecting the AM modulated wave.

12. A playing apparatus for playing data in a separate hard disk device, the playing apparatus comprising:
a casing;
a spindle accommodated within the casing;
a recording medium disk rotatably supported on the spindle and having data recorded therein as pits formed thereon by nano-imprinting;
an arm mechanism pivotably supported within the casing;
a device-side power supply circuit accommodated within the casing and configured to receive supply of power from the apparatus-side power source circuit of the playing apparatus without contacting the apparatus-side power source circuit;
a VCM coil accommodated within the casing, and configured to drive the pivoting of the arm mechanism based on a drive current supplied from the device-side power supply circuit;
a head slider that is attached to a distal end of an arm of the arm mechanism and has strip line circuits, the strip line circuits including
an oscillator configured to output a carrier wave,
a resonator circuit into which the carrier wave is configured to be inputted, the resonator circuit including an electrode that is configured to detect an electrostatic capacitance between itself and the recording medium, the resonator circuit being further configured to output an AM modulated wave by the AM modulation of the carrier wave based on the detected electrostatic capacitance, and
a detector circuit that is configured to output the electrostatic capacitance by detecting the AM modulated wave;
a communicator configured to receive signals indicating the electronic capacitance detected by the head slider and send the signals to the apparatus-side communicator, and receive drive signals from the apparatus-side communicator and send the drive signals to the VCM coil;
a pair of VCM magnets between which the VCM coil is disposed;
an apparatus-side communicator configured to communicate with the device-side communicator to receive signals therefrom;
a spindle motor adapted to drive the spindle without contacting the spindle; and
a signal processor operatively coupled to the apparatus-side communicator and configured to process signals received from the device-side communicator.

13. The playing apparatus according to claim 12, further comprising:
an apparatus-side power supply circuit configured to supply power to the device-side power supply circuit.

14. A hard disk system, comprising:
a playing apparatus including
a pair of VCM magnets,
an apparatus-side communicator,
a spindle motor,
a signal processor operatively coupled to the apparatus-side communicator to process signals received by the apparatus-side communicator, and
an apparatus-side power supply circuit; and a hard disk device mounted onto the playing apparatus to play data in the hard disk device, the hard disk device including
  a casing,
  a spindle accommodated within the casing and configured to be driven by the spindle motor without being contacted by the spindle motor,
  a recording medium disk rotatably supported on the spindle and having data recorded therein as pits formed thereon by nano-imprinting,
  an arm mechanism pivotably supported within the casing,
  a device-side power supply circuit accommodated within the casing and configured to receive supply of power from the apparatus-side power circuit without contacting the apparatus-side power source circuit,
  a VCM coil accommodated within the casing, adapted to be positioned between the VCM magnets, and configured to drive the pivoting of the arm mechanism based on a drive current supplied from the device-side power supply circuit,
  a head slider that is attached to a distal end of an arm of the arm mechanism and configured to detect the data in the recording medium disk, the head slider having strip line circuits, the strip line circuits including
    an oscillator configured to output a carrier wave,
    a resonator circuit into which the carrier wave is configured to be inputted, the resonator circuit including an electrode that is configured to detect an electrostatic capacitance between itself and the recording medium, the resonator circuit being further configured to output an AM modulated wave by the AM modulation of the carrier wave based on the detected electrostatic capacitance, and
    a detector circuit that is configured to output the electrostatic capacitance by detecting the AM modulated wave, and
  a device-side communicator configured to receive signals indicating the electronic capacitance detected by the head slider and send the signals to the apparatus-side communicator, and receive drive signals from the apparatus-side communicator and send the drive signals to the VCM coil.

15. The hard disk system according to claim 14, wherein the recording medium disk is a ROM disk.

16. The hard disk system according to claim 14, wherein the recording medium disk has a ROM and a RAM, and the device-side communicator is configured to receive data to be recorded in the recording medium disk from the apparatus-side communicator.

* * * * *